Feb. 4, 1947.　　　S. C. HURLEY, JR　　　2,415,178
PHOTOELECTRIC INSPECTION OF ROUNDS
Filed Sept. 23, 1944　　　2 Sheets-Sheet 1

INVENTOR.
SAMUEL C. HURLEY JR.
BY Benedict & Swartwood
Attorneys

Patented Feb. 4, 1947

2,415,178

UNITED STATES PATENT OFFICE 2,415,178

PHOTOELECTRIC INSPECTION OF ROUNDS

Samuel C. Hurley, Jr., Danville, Ill.

Application September 23, 1944, Serial No. 555,473

1 Claim. (Cl. 250—41.5)

This invention relates to an apparatus for the photoelectric inspection of an article having round surfaces by rotating the article in the photoelectric inspection zone in such a manner that the axis of the rotation extends in substantially the same direction as the axis of the light beam used in the photoelectric inspection. Among the objects of the invention are the following:

1. To inspect rounds such as cylinders, cones, segments of cones and cylinders, etc.

2. To inspect annular objects such as cylinders and frustums of right circular cones, or the interior of any object having a cylindrical opening therethrough.

3. To inspect annular objects for concentricity and eccentricity.

4. To provide a minimum number of light sensitive devices to accomplish the desired inspection.

5. To provide a novel apparatus for scanning round surfaces.

One of the principal advantages of my invention over previous devices is that I am able to scan and thereby inspect an article having a round surface with a minimum number of light sensitive devices. Previously, if it were desired to scan the article, a large number of phototubes would have to be placed around the image of the article in order to provide a sufficient number to inspect all of the round surfaces desired. This involves complicated wiring circuits and the use of costly apparatus. In summary, some of the principal advantages of my invention are:

1. Simplicity.

2. Accuracy.

By my device, I can accurately scan the entire surface, either external or internal, of a round, whereas in the prior art devices it was impossible to scan the entire surface of the round and such a scanning could only be approached by employing an impractically large number of light sensitive devices.

In general, my device comprises an optical system including a light source and means for projecting a beam of light through an inspection zone. The article to be inspected is rotated in the inspection zone in such a manner that the axis of rotation extends in substantially the same direction as the axis of the light beam. In my preferred embodiment, the axis of rotation coincides with the axis of the light beam. Light sensitive devices are spaced to receive light passing through the inspection zone, either directly or indirectly by means of a suitable magnifying mirror. A magnifying mirror is preferred since it enlarges the image to a point where errors in the inspection are eliminated. The light sensitive devices may be arranged such that the image will fall between any pair of them and thus the results of the inspection are determined when one light sensitive device is in light and the other is in shadow.

By using the above device, I am able to inspect any object having a round surface. I may determine by my apparatus the inside and outside diameters, as well as the concentricity and eccentricity of a cylinder throughout its entire length, and at the same time indicate any ridges or other raised defects on the surfaces of the cylinder.

Other objects and advantages and uses of my apparatus will become apparent by referring to the drawings in which Figure 1 illustrates diagrammatically the arrangement of phototubes or other light sensitive devices for simultaneously and independently measuring a hollow cylinder for internal and external diameters as well as for concentricity and eccentricity. The tolerances for the several inspections may be independently varied by the proper spacing of the phototubes. Phototubes 1 and 2 are used to inspect the cylinder for concentricity and eccentricity and the tolerance may be varied by varying the distance between the tubes. Phototubes 3 and 4 are positioned and arranged to measure the inside diameter and the tubes 5 and 6 are positioned and arranged to measure the outside diameter. Thus, three different inspections may be made and, if desired, with three separate tolerance requirements with the use of only six phototubes.

Figure 1:
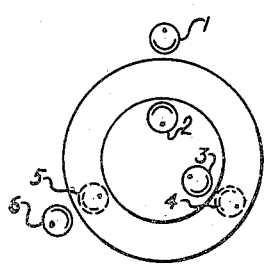
Figure 2:
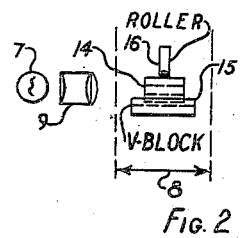
Figure 2 illustrates one optical system which may be used to accomplish the inspections indicated in Figure 1.

Referring to Figure 2, I have illustrated one optical system which may be considered illustrative of the optical systems that I may employ in any of the inspections made by my device. I will describe Figure 2 in relation to the inspections effected by the arrangement of the phototubes in Figure 1. Light from a light source 7 is projected through the inspection zone 8 by means of condenser lenses 9. The beam of light passing through the inspection zone 8 is projected through the condensing lens 12 onto magnifying mirror 13. The mirror 13 may be any suitable magnifying mirror, but is shown as a spherical mirror. In this case, the hollow cylinder 14 to be inspected is rotated in a V block 15 which serves as a reference point. The cylinder may be rotated by means of roller 16 which may be rotated in conventional manner (not shown).

In the illustration of Figure 2 for an article meeting all the required specifications, that is, proper inside and outside diameters, and the inside and outside surfaces concentric, phototubes 1, 2, 3, and 6 are in light, whereas phototubes 4 and 5 are in shadow. Tubes 1 and 2 indicate the concentricity of the cylinder and tubes 5 and 6 indicate the external diameter, although other arrangements of the tubes may be made. The phototubes are shown diagrammatically in Figures 1 and 2 and it is to be understood that they may be arranged in the same or different planes of magnification in order that the shadow cast by the article in the inspection zone will fall between the proper phototubes in order to obtain the desired inspection.

The tolerances may be independently varied. For example, if a closer tolerance is required for the concentricity, tubes 1 and 2 may both be placed closer to the shadow of the object. Likewise, for measuring the inside diameter, the distance between tubes 3 and 4 can be varied for varying the tolerance. If a closer tolerance is desired, tubes 3 and 4 may be placed closer together. Furthermore, the tolerance for the minimum required inside diameter may be different than that required for the maximum inside diameter. If the inside diameter must not be any less than the predetermined requirement, although it can be greater within a certain tolerance, tube 3 must be close to the shadow and tube 4 can be farther into the shadow, depending on the tolerance required. In other words, not only can the overall tolerance for each inspection be varied, but the maximum and minimum tolerances can also be independently varied.

Figure 3:
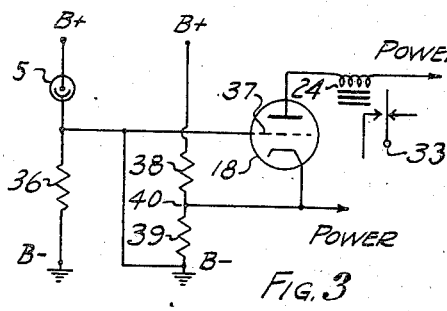
Figures 3 and 4 illustrate circuits which may be used for determining the state of illumination of the phototubes shown in Figures 1 and 2.

Figure 3 illustrates in more detail, one specific wiring diagram for the light sensitive circuit including the amplifier 18, the relay coil 24, the relay switch 33, and the phototube 5 which is the tube in shadow when the piece has a proper outside diameter. The phototube 5 is connected across a source of D. C. potential as shown and resistor 36 is connected near the negative terminal of the source of potential to provide a positive potential on the control grid 37 of amplifying tube 18 when the tube 5 is in light. When the tube 5 is placed in light due to too small an outside diameter, current will flow through tube 5 and the bias on the control grid 37 is driven in a positive direction with respect to the cathode of the tube since the cathode is connected at point 40 between dividing resistors 38 and 39 which are connected across the source of D. C. potential as indicated. When tube 5 is in shadow, the negative bias maintained on the control grid prevents tube 18 from conducting, which, in turn, prevents the relay coil 24 from being energized. When tube 5 is in light, the bias on the control grid 37 is changed in a positive direction and the tube 18 will conduct which will energize relay coil 24, and open the relay switch 33. When tube 5 is in shadow, the relay switch 33 closes.

Figure 4:
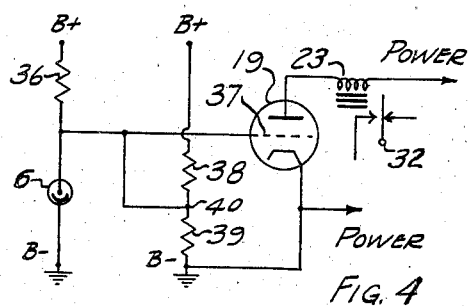

In like manner, Figure 4 illustrates a means for preventing the energizing of the relay coil 23 when the tube 6 is in light, thereby indicating a good piece. When tube 6 is in shadow, the control grid 37 of the tube 19 is maintained positive in respect to the cathode and the relay coil 23 is energized which actuates the relay switch 32. If tube 6 should be placed in shadow due to too large an outside diameter, current will flow through amplifying tube 19 because the bias on the control grid 37 is driven in a positive direction, and relay switch 32 will be actuated.

Figure 7:
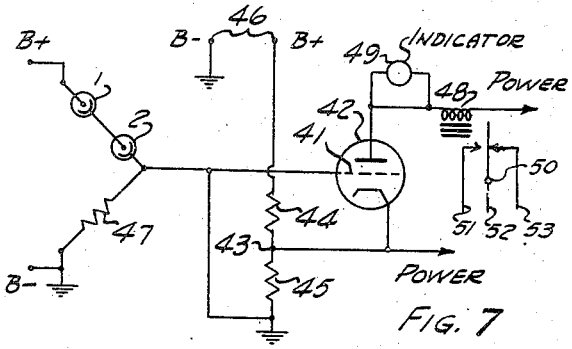
Figure 7 illustrates apparatus for determining the concentricity as indicated by tubes 1 and 2 of Fig. 5.
Figure 8:
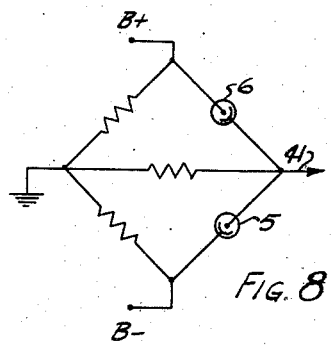
Figure 8 illustrates an arrangement of tubes 5 and 6 shown in Figure 1 for independently determining the outside diameter.
Figure 9:
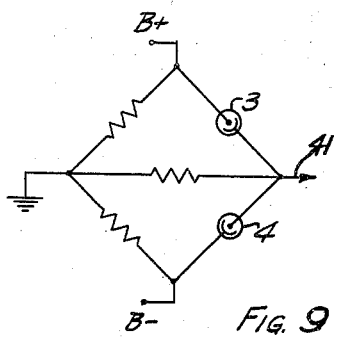
Figure 9 illustrates a wiring diagram for tubes 3 and 4 of Figure 1 for indicating the inside diameter.

Figures 8 and 9 illustrate other wiring circuits for the tubes shown in Figure 1 wherein it is desired to independently indicate the results of the different inspections. In this case, the tubes 5 and 6 for measuring outside diameter, and the tubes 3 and 4 for measuring inside diameter are connected in separate bridge circuits. When the bridges are in balance, no current flows across the bridges and the piece does not meet the required specifications. When tubes 6 and 3 are in light and tubes 5 and 4 are in shadow, the bridges are unbalanced and current will flow, and by the use of suitable amplifiers and indicating devices, such as are shown in Figure 7, such conditions of light and shadow on the phototubes are indicated.

Figure 5:
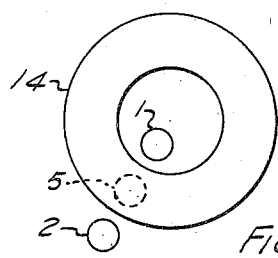
Figure 5 illustrates diagrammatically the simultaneous inspection of a cylinder for inside and outside diameters and for eccentricity and concentricity using only three phototubes. With this arrangement of the tubes, the tolerances cannot be independently varied; although the overall tolerance can be varied.

Figure 5 shows an arrangement of only three phototubes whereby several inspections of the cylinder may be made simultaneously. In this case, the simultaneous inspections may comprise the measurement or indication of eccentricity and concentricity, the inside diameter and the external diameter. This arrangement, while having the advantage of simplicity has the disadvantage that the tolerances cannot be independently varied, but, nevertheless, this arrangement has many uses for rapidly making the above mentioned inspections. For a standard article tubes 1 and 2 are in light and tube 5 is in shadow.

Figure 6:
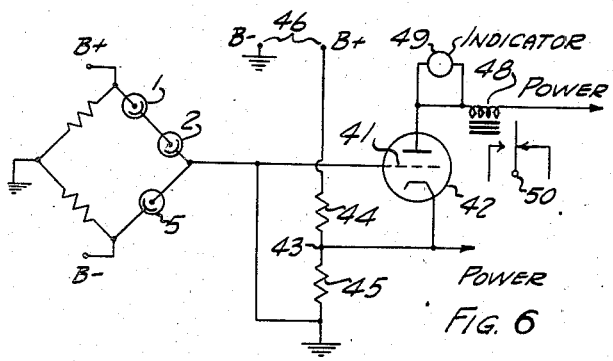
Figure 6 illustrates one apparatus for determining the state of illumination of the phototubes used in the inspection illustrated in Figure 5.

Figure 6 illustrates one wiring diagram for the light sensitive circuit which may be used to make the simultaneous inspections mentioned in connection with the description of Figure 5. In this case, the phototubes 1 and 2 and 5 are connected in a bridge circuit as shown. If the bridge circuit is balanced by all the tubes being in light or tube 5 and one of the tubes 1 and 2 in shadow, no current will flow across the bridge and the bias on the control grid 41 of the tube 42 is maintained negative since the control grid is connected to ground and the cathode is connected to a relatively high positive potential at a point 43 between dividing resistors 44 and 45 connected to a source of D. C. potential 46. Thus, when the bridge is balanced, tube 42 is unable to conduct and therefore no current will flow through its plate circuit. When the bridge is unbalanced as is the case when tubes 1 and 2 are in light and tube 5 is in shadow, thereby indicating a good piece, current will flow across the bridge, driving the bias on control grid 41 in a positive direction which causes tube 42 to conduct and current will flow through the plate circuit. Any conventional means for indicating when current flows through the tube 42 may be used. For example, an indicator of any suitable type may be connected directly in the plate circuit; or if desired, a relay coil 48 may be inserted in the plate circuit which will actuate the relay switch 50. Any of these means may be used for determining the state of illumination of the tubes in the bridge circuit. Current will not flow through the tube 42 when the bridge is unbalanced by either tube 1 or 2 being placed in shadow and tube 5 being placed in light.

Figure 10:
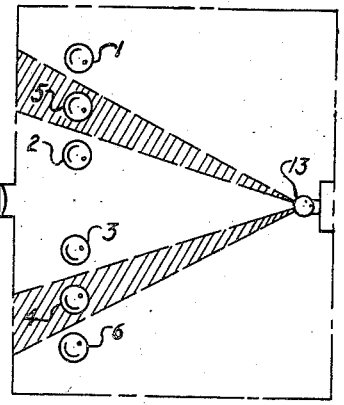
Figure 10 illustrates a device for accepting or rejecting the article inspected.
Figure 10:
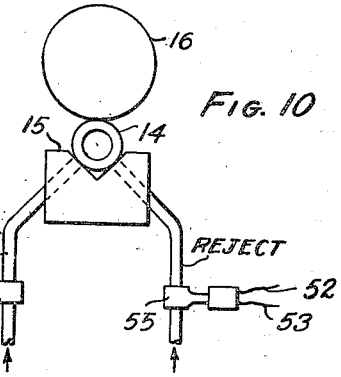

The circuit shown in Figure 7 is substantially the same as that shown in Figure 6 and is used, for example, when only the eccentricity and concentricity of the piece are to be determined. In this case, it is not necessary to use a bridge circuit but the tubes 1 and 2, and resistor 47, are connected across a source of D. C. potential, as shown. When tubes 1 and 2 are in light, a positive potential is placed on the control grid 41 of tube 42 relative to the cathode and the tube will conduct current. The relay switch 50 is shown in the position that it occupies when no current is passing through tube 42, which is the condition prevailing when either tube 1 or 2 is placed in shadow, thereby indicating a bad piece. When tubes 1 and 2 are in light, the relay switch will be actuated connecting lines 51 and 52. Thus, the relay switch may be used to control an accept and reject mechanism as shown in Figure 10. When the relay switch 50, shown in Figure 7, is actuated by a flow of current through the tube 42, it closes the circuit connecting lines 51 and 52 which actuates the solenoid valve 54 shown in Figure 10 which permits a stream of air or other gas to flow through the pipe and sends the acceptable piece to the accept receptacle. When the article is eccentric, current will not flow through tube 42 and the relay switch 50 will then complete the circuit connecting lines 52 and 53 which will actuate the solenoid valve 55 of Figure 10, thereby rejecting the piece. Other conventional means for selecting the article according to the inspection made thereon may be used.

While I have described the use of phototubes as the light sensitive devices, any suitable devices may be used, e. g., photocells. Any suitable type of amplifiers may be used such as those of the glow type, thermionic type, vacuum type, and gas-filled arc discharge type.

Throughout the specification wherein I have referred to a positive potential, or a positive bias applied to the control grid to cause current to flow through the amplifying tube, I mean to include at least a bias sufficient to initiate the flow of current. For example, some tubes will begin to conduct when the bias is slightly negative, say within a minus five bolts.

While I have described and illustrated some of the preferred means of carrying out my invention, the description and the drawings are not intended to limit my invention since my invention is covered by the following claim:

I claim as my invention:

Apparatus for inspecting an article comprising means defining an inspection zone, means for projecting a beam of light through said inspection zone, means for rotating an article in said zone about an axis coinciding with the longitudinal axis of the article and extending in substantially the same direction as the light beam, two photoelectric devices arranged to receive light from said beam passing through the inspection zone, said devices being positioned adjacent, and on opposite sides of, a portion of the outline of a shadow resulting from the interception of a part of said light beam due to the presence of a standard article in the inspection zone, whereby one device is in light and the other in shadow when a standard article is in the inspection zone, said devices being connected in a circuit so that the flow of current in said circuit is changed when said light and shadow conditions change as a result of a different interception of the light beam due to the presence in the inspection zone of an article which does not conform to the standard, said circuit comprising an electronic tube having an anode circuit, a cathode circuit and a control grid, said grid being connected in the circuit including the photoelectric devices so as to be controlled in accordance with changes in light and shadow conditions of the photoelectric devices.

SAMUEL C. HURLEY, Jr.

REFERENCES CITED

The following references are of record in the file of this patent:

UNITED STATES PATENTS

| Number | Name | Date |
| --- | --- | --- |
| 2,085,671 | Powers | June 29, 1937 |
| 2,313,218 | Brace et al. | Mar. 9, 1943 |
| 2,051,695 | Glacy | Aug. 18, 1936 |
| 2,318,856 | Hoffman | May 11, 1943 |
| 2,008,567 | Simonton | July 16, 1935 |
| 2,033,645 | Parkhill | Mar. 10, 1936 |

FOREIGN PATENTS

| Number | Country | Date |
| --- | --- | --- |
| 790,265 | French | Sept. 2, 1935 |